United States Patent
Hagemeyer et al.

(10) Patent No.: US 8,129,963 B2
(45) Date of Patent: Mar. 6, 2012

(54) DC TO DC CONVERTER

(75) Inventors: Frank Hagemeyer, Wedemark (DE); Peter Himmelreich, Burgwedel (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 633 days.

(21) Appl. No.: 12/158,949

(22) PCT Filed: Dec. 20, 2006

(86) PCT No.: PCT/EP2006/070012
§ 371 (c)(1), (2), (4) Date: Oct. 22, 2008

(87) PCT Pub. No.: WO2007/077131
PCT Pub. Date: Jul. 12, 2007

(65) Prior Publication Data
US 2011/0050195 A1    Mar. 3, 2011

(30) Foreign Application Priority Data
Dec. 30, 2005  (DE) .......................... 10 2005 063 189

(51) Int. Cl.
*G05F 1/40* (2006.01)
(52) U.S. Cl. ........... 323/271; 363/49; 323/284; 323/901
(58) Field of Classification Search .............. 363/49; 323/271, 272, 282, 284, 901, 908
See application file for complete search history.

(56) References Cited

U.S. PATENT DOCUMENTS

| | | | | |
|---|---|---|---|---|
| 4,590,395 A | * | 5/1986 | O'Connor et al. | 327/374 |
| 4,962,349 A | * | 10/1990 | Albach et al. | 323/265 |
| 5,659,241 A | | 8/1997 | Horiuchi et al. | |
| 5,828,112 A | * | 10/1998 | Yamaguchi | 257/378 |
| 7,078,883 B2 | * | 7/2006 | Chapman et al. | 323/232 |

FOREIGN PATENT DOCUMENTS

| | | |
|---|---|---|
| EP | 0326220 A | 8/1989 |
| EP | 1087511 A | 3/2001 |
| FR | 2744299 A | 8/1997 |
| JP | 03074169 A | 3/1991 |
| JP | 2001069749 A | 3/2001 |

OTHER PUBLICATIONS

International Search Report PCT/EP2006/070012 dated Mar. 28, 2007.

* cited by examiner

*Primary Examiner* — Jessica Han
(74) *Attorney, Agent, or Firm* — Kilpatrick Townsend & Stockton LLP

(57) ABSTRACT

The invention relates to a DC to DC converter comprising a DC to DC converter unit (DCW), a first field effect transistor (FET1) for the voltage conversion, a bipolar transistor (BP1) as a starting aid, and a second field effect transistor (FET2) for switching-off the bipolar transistor (BP1). Said bipolar transistor (BP1) is mounted in parallel with the first field effect transistor (FET1), and the second field effect transistor (FET2) is mounted upstream of the bipolar transistor (BP1).

3 Claims, 4 Drawing Sheets

DC TO DC CONVERTER

The present application claims benefit of priority of PCT Application No. PCT/EP2006/070012, filed on Dec. 20, 2006, which claims priority to DE Application No. 10 2005 063 189.4 filed on Dec. 30, 2005. The contents of the above-listed applications are incorporated herein by reference in their entirety.

The present invention relates to a DC to DC converter.

DC to DC converters for conversion of a first DC voltage into a second DC voltage are well known. Such DC converters are used, for example, for the voltage supply of portable electronic devices, in order to convert a DC voltage supplied by an energy supply source (battery, accumulator) into a further, mostly higher DC voltage.

It is an object of the present invention to provide a DC to DC converter that comprises a high efficiency and a low voltage for switching-on.

Thus, a DC to DC converter comprising a DC to DC converter unit, a first field effect transistor for the voltage conversion, a bipolar transistor as a starting aid, and a second field effect transistor for switching-off the bipolar transistor, is provided. The bipolar transistor is mounted in parallel with the first field effect transistor, and the second field effect transistor is mounted upstream of the bipolar transistor.

Hence, a DC to DC converter is provided that can be activated also at a low starting voltage, due to the low threshold voltage of the bipolar transistor. This bipolar transistor, however, is switched-off after the starting process, since the bipolar transistor has a negative effect on the efficiency. Consequently, a DC to DC converter is provided that has a high efficiency and is able to start regardless of a low voltage.

A DC to DC converter thus comprises a field effect transistor for the voltage conversion, a bipolar starting aid transistor, which is mounted in parallel with the field effect transistor for the voltage conversion, and a switch-off field effect transistor. The switching-off field effect transistor is mounted upstream of the bipolar starting aid transistor. At starting, i.e. at switching-on, the voltage for the field effect transistor for the voltage conversion as a switching transistor is too low. The start, therefore, can take place only with the starting aid transistor parallel mounted therewith. Once the circuit has started, it generates a sufficient voltage for the operation of the field effect transistor for the voltage conversion so that the function of the starting aid transistor is not necessary anymore. By means of a single-stage cascade, a voltage of at least 12 V can be generated. By way of this voltage, the switching-off field transistor upstream of the starting aid transistor becomes high-resistance so that the starting aid transistor becomes "invisible" for the circuit.

Further developments of the invention are subject matter of the sub-claims.

Hereinafter, the present invention will be described in more detail with reference to the attached drawing.

Figure 1:
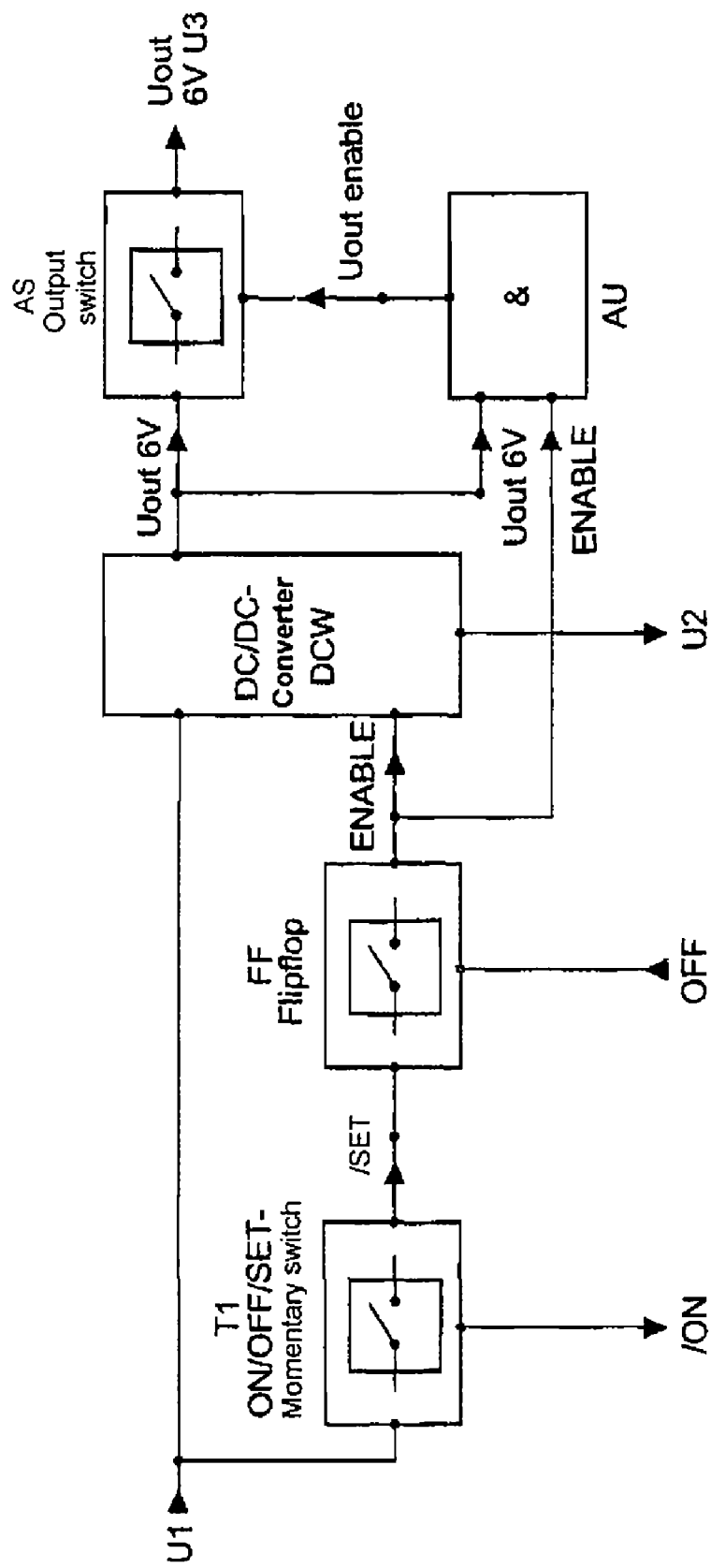
Figure 2A:
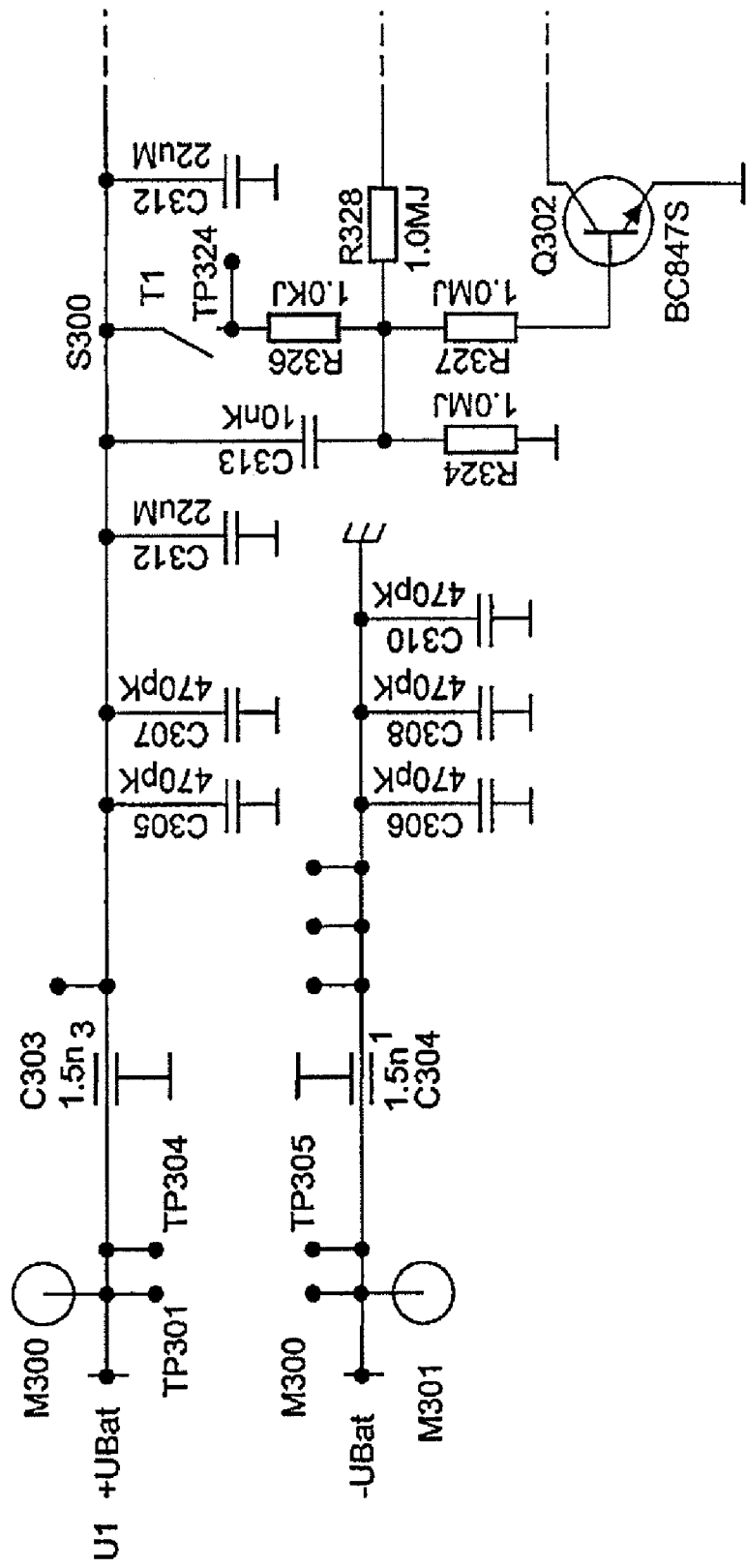
Figure 2B:
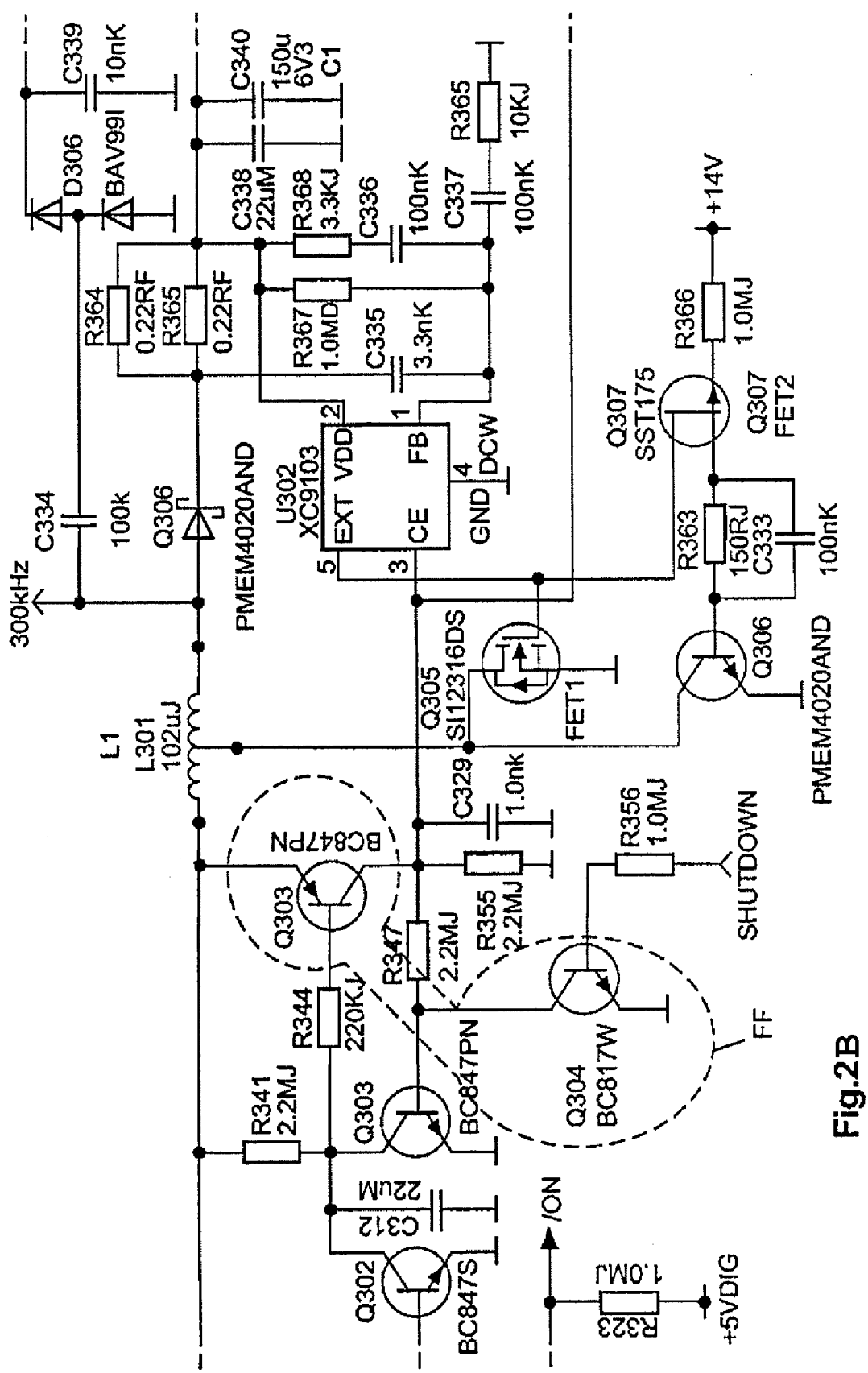
Figure 2C:
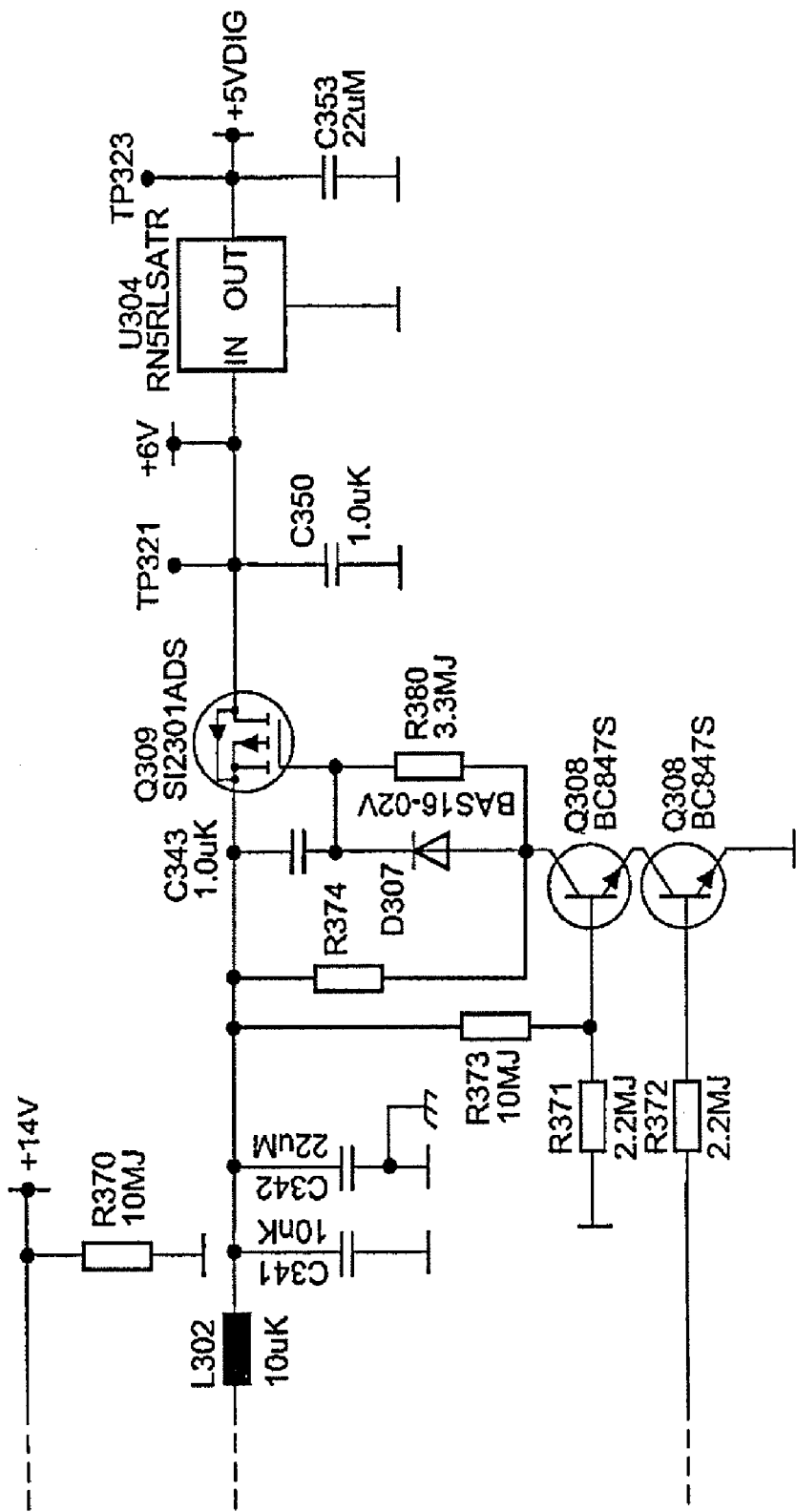

FIG. 1 shows a block circuit diagram of the DC to DC converter according to the invention, and FIGS. 2A-2C show a circuit diagram of the DC to DC converter of FIG. 1.

FIG. 1 shows a block circuit diagram of DC to DC converter according to the invention. The DC to DC converter comprises an input, to which a first voltage U1 is applied. The first voltage corresponds to a battery voltage, which provides the energy supply for an electronic device. The DC to DC converter further comprises an On/Off momentary switch T1, a flip-flop unit FF, a DC to DC converter unit DCW, an addition unit AU and an output switch AS. The DC to DC converter outputs a second voltage U2 and a third voltage U3.

When the momentary switch T1 is actuated, then the signal /SET goes to a lower level and the flip-flop unit FF is set. If the device, however, is already switched-on, the /SET is without effect, since the flip-flop unit FF is already set and remains in this state. The output signal /ON of the momentary switch T1 is received by a processor and is processed accordingly. If the device, however, is still switched-off, the signal /SET sets the flip-flop unit FF and the switching-on process starts. The signal /ON remains without effect, since the processor is not yet in operation, since the switching-on process just starts.

The flip-flop unit FF serves for switching on and off of the DC to DC converter unit DCW. The flip-flop unit FF is switched-on and set, respectively, by the momentary switch T1. As an alternative, the flip-flop unit FF is switched-on when a charged battery cell and accumulator cell, respectively, is inserted into the device. The flip-flop unit FF can be switched-off and reset, respectively, by continuous pushing of the momentary switch T1 by a processor, if the momentary switch is held over a period of longer than about one or more seconds.

The DC to DC converter unit DCW is activated by the signal ENABLE. The output switch AS serves for outputting the 6 V output voltage of the DC to DC converter unit to the electronic device as a third voltage U3. This takes place when the DC to DC converter unit DCW works and generates an output voltage, and the flip-flop unit FF is set. Thus, it can be ensured that the output voltage is not put out before the converter unit DCW, after an activation, is in a steady-state condition. It can further be ensured that the output voltage is definitely switched-off with the switching-off of the converter.

FIGS. 2A-2C show a circuit diagram of the DC to DC converter of FIG. 1. The circuit diagram of the DC to DC converter shown in FIGS. 2A-2C, and the concrete values of the individual elements, serve only for illustration of the function of the converter, and are not to be seen as limiting. The first voltage U1 is applied to the input of the DC to DC converter. The DC to DC converter comprises a momentary switch T1, a flip-flop unit FF and a DC to DC converter unit DCW. Further, the circuit comprises an inductance L1, a capacitance C1, a first field effect transistor FET1, a second field effect transistor FET2 and a bipolar transistor BP1.

If, for a certain time, no battery or accumulator cell is present in the battery compartment of the electronic device, the capacitance C313 can discharge. At capacitor C313, a voltage will arise, which corresponds approximately to the cell voltage. It will result from the voltage divider R324, the rest of the connected circuit and the leakage resistance of the capacitor. The momentary switch will bypass the leakage resistance and increase the voltage at the base of Q302. The transistors become conductive and, among other things, set the flip-flop. The transistor Q302 sets the flip-flop when a positive voltage is applied to its base. The same can be transmitted from a charged cell via the momentary switch, but also the positive voltage jump, upon inserting of a charged cell, is sufficient. This voltage jump is transmitted by C313 to the base of the transistor. If, however, a battery, or an accumulator cell is inserted in the battery compartment, a positive voltage jump is transmitted to the next node. If the battery cell, or the accumulator cell, is located in the battery compartment for a certain time, the capacitance 313 is charged via its leakage resistance to the cell voltage. Thus, the voltage at a subsequent node can be increased via momentary switch T1. Thus, both transistors Q302 become conductive, and the output signal of the momentary switch T1 is set to a lower level, and the flip-flop unit FF is set. The transistor Q302 is used to decouple some functions, since a set flip-flop would block the signal /ON.

The flip-flop unit includes a dual transistor Q303 and can be reset only by a processor.

The DC to DC converter unit DCW can, for example, include an IC XC9103 from Torex. This converter can control, for example, an external transistor with a switching frequency of 300 kHz. For decreasing the noise, the capacitors are connected in parallel with the resistor of a voltage divider. Controlling of the converter unit DCW takes place at a constant frequency via a pulse width modulation PWM. An inductance L1 (L301) is provided as a converter coil. Preferably an autotransformer is used. Through the winding ratio of this converter-transformer, the pulse-pause ratio of the converter can be set.

The resistors R364 and R365 serve for decoupling the filter capacitors C338 from the control circuit. At the capacitor C389, a voltage of 14 V can be gained, which represents only an uncontrolled voltage, and hence can be loaded only with a low current.

A conducting transformer Q305, i.e. the first field effect transistor FET1, initiates a current flow through the primary winding of the converter-transformer. When this transformer becomes high-resistance, the excited coil forces the current further through the diode Q306 and charges the filter capacitor C340. The longer the transistors are conductive, the higher is the current which charges the capacitors.

Hereinafter a starting of the converter with a low battery or cell voltage (U1) is described. For the starting, in particular necessary are the first field effect transistor FET1, which represents a field effect transistor for the voltage conversion Q305, the first bipolar transistor BP1, which represents a starting aid transistor Q306, which is connected in parallel with the first field effect transistor FET1, and the second field effect transistor FET2, Q307, which represents a depletion-type switching-off field effect transistor.

If the cell voltage is, for example, only 0.7 V, then the converter unit DCW can provide only a gate-source voltage of 0.7 V at the first field effect transistor FET1. With such a gate-source voltage, the resistance of the drain-source path of the field effect transistor is not low enough to sufficiently excite the converter choke L1.

The bipolar transistor BP1, Q306, however, becomes conductive at a base-emitter voltage of 0.7 V in order to start the conversion process. When the output voltage is increasing, then the first field effect transistor FET1 can work accordingly.

Preferably, the output (i.e. the driver or signal output for the external switching transistor EXT, Pin 5) of the converter unit DCW is rated with regard to a high input resistance. The low input resistance of the bipolar transistor BP1, however, represents a loading for this signal. This causes that the converter unit, in fact, can be operated; however, a low efficiency will arise. This is particularly disadvantageous for a long service life of the battery cells, or accumulator cells. Thus, the depletion-type second field effect transistor FET2, Q307 is arranged upstream of the bipolar transistor BP1, which functions as a starting aid transistor. This second field effect transistor FET2 is low-resistance at starting so that the bipolar transistor BP1 can work.

By means of a single-step cascade, a voltage of about 12 V is generated. The same causes the second field effect transistor FET2, upstream of the bipolar transistor BP1, to become high-resistance. The signal for the switching transistors branches out and is applied parallel at the gate of the switching FET1, and, via the depletion-type FET2, at the base of the bipolar switching transistor BP1. When the converter works, the voltage of about 12 V, generated in the cascade, causes that FET2, upstream of BP1, becomes high-resistance. In this case, BP1 cannot load the circuit.

In order to enable an output voltage of 6 V at the DC to DC converter, the flip-flop FF must be set, and an operation voltage must be available. If both conditions are met, the transistors Q308 become conductive. However, before the transistor Q 309 can become conductive, the capacitance C343 must be charge-reversed via resistor R380. Hence, the output voltage is transmitted with a delay of about one second to the electronic device. During this time, all transient processes of the converter unit DCW can securely be finished.

If the flip-flop FF is not set anymore, then the capacitor C343 can be discharged via diode D307. The transistor Q309 then blocks considerably faster than during the switching-on.

The first field effect transistor FET1, Q305 should comprise a low drain-source resistance at a low gate-source threshold voltage and a gate capacitance as low as possible.

A switching converter PMEM4020AND can comprise the bipolar transistor BP1.

The second field effect transistor FET2, Q307 should comprise a minimal drain-source resistance at a gate-source voltage of 0 V. The voltage, at which the drain-source resistance becomes maximal, should be as low as possible.

The converter unit DCW should ensure a start at an operation voltage as low as possible, should comprise a high clock rate due to the size of the components, and should comprise a clock rate which is not too high, due to the losses because of the gate capacitance of the first field effect transistor FET1, Q305.

Further, the converter unit DCW should comprise a pure pulse width operation in order to be able to securely handle HF interferences from the converter frequency. Further, an external circuit of all components should be ensured. The output voltage can be 6 V and the output current can be between 0 and 50 mA.

The transformation ratio of the converter choke L1, L301 can, for example, comprise 1:4, so that the converter unit DCW can stabilize the output voltage also at an input voltage of 0.4 to 5 V. Further, the converter choke L1, L301 should comprise an inductance as high as possible in order to ensure a secure start even at low operation voltages. Since the volume for the windings is predetermined, the wire gauge will decrease with increasing number of windings, and the DC resistance will increase. Preferably, the windings comprise 6 µH:100 µH in order to allow the converter to start securely, beginning at 0.6 V. Such inductances can be realized with windings of 8:32. Per winding, a single wire with a diameter of preferably primary 0.26 mm and secondary 0.15 mm is sufficient. With such wire gauges, a primary current of up to 500 mA can flow, also over a long period of time. The selected core preferably consists of the material N48 and comprises an $A_L$ value of 100.

The above described DC to DC converter can, for example, be provided in a pocket transmitter for a wireless microphone and a wireless in-ear monitor, respectively. Alternatively, or additionally, the DC to DC converter can also be implemented in a wireless microphone, a wireless headset, a wireless hearing aid, or the like.

Alternatively, or additionally, the above described DC to DC converter can also be used in a portable electronic or electrical device.

The invention claimed is:

1. A DC to DC converter, comprising
a DC to DC converter unit for conversion of a first DC voltage into a second DC voltage, a first field effect transistor for voltage conversion,
a bipolar transistor as a starting aid at switching-on of the DC to DC converter, wherein the bipolar transistor is coupled in parallel with the first field effect transistor, and
a second field effect transistor for deactivating the bipolar transistor, wherein the second field effect transistor is connected upstream of the bipolar transistor, the first field effect transistor being an enhancement-type field effect transistor and the second field effect transistor being a depletion-type field effect transistor.

2. The DC to DC converter according to claim 1, wherein the bipolar transistor is active only during a starting of the DC to DC converter.

3. An electronic device, comprising a DC to DC converter according to claim 1.

* * * * *